US007917362B2

(12) United States Patent
Shieh

(10) Patent No.: US 7,917,362 B2
(45) Date of Patent: Mar. 29, 2011

(54) METHOD AND APPARATUS FOR DETERMINING A BIT BOUNDARY OF A REPETITION-CODED SIGNAL

(75) Inventor: Jia-Horng Shieh, Taipei County (TW)

(73) Assignee: MediaTek Inc., Science-Based Industrial Park, Hsin-Chu Hsien (TW)

( * ) Notice: Subject to any disclaimer, the term of this patent is extended or adjusted under 35 U.S.C. 154(b) by 1379 days.

(21) Appl. No.: 11/379,233

(22) Filed: Apr. 19, 2006

(65) Prior Publication Data

US 2007/0250309 A1 Oct. 25, 2007

(51) Int. Cl.
*G10L 15/04* (2006.01)
*H04B 7/26* (2006.01)

(52) U.S. Cl. ........ 704/248; 704/237; 704/229; 704/253; 704/201; 342/357.63; 342/357.69; 375/149

(58) Field of Classification Search .......... 704/201, 704/227, 228, 253, 254, 229, 248, 237; 342/357.63, 342/357.69; 375/149
See application file for complete search history.

(56) References Cited

U.S. PATENT DOCUMENTS

| 4,426,712 | A | * | 1/1984 | Gorski-Popiel | 375/343 |
| 5,263,054 | A | * | 11/1993 | Davis et al. | 375/340 |
| 5,835,530 | A | * | 11/1998 | Hawkes | 375/225 |
| 6,289,041 | B1 | * | 9/2001 | Krasner | 375/152 |
| 6,345,073 | B1 | * | 2/2002 | Curry et al. | 375/265 |
| 6,512,479 | B1 | * | 1/2003 | Sahai et al. | 342/357.63 |
| 6,529,148 | B1 | * | 3/2003 | Maddux | 341/100 |
| 6,542,865 | B1 | | 4/2003 | Nagao | |
| 6,661,371 | B2 | * | 12/2003 | King et al. | 342/357.62 |
| 6,738,364 | B1 | * | 5/2004 | Saunders | 370/332 |
| 6,768,451 | B2 | * | 7/2004 | Akopian et al. | 342/357.4 |
| 6,970,500 | B1 | * | 11/2005 | Sanders | 375/150 |
| 7,499,485 | B2 | * | 3/2009 | Cho | 375/150 |
| 7,535,959 | B2 | | 5/2009 | Lightstone | |
| 7,778,311 | B2 | * | 8/2010 | Jia et al. | 375/150 |
| 2002/0159542 | A1 | | 10/2002 | Kokkonen et al. | |
| 2003/0227963 | A1 | * | 12/2003 | Dafesh | 375/149 |
| 2003/0234740 | A1 | * | 12/2003 | Akopian et al. | 342/357.12 |
| 2004/0012521 | A1 | * | 1/2004 | Akopian et al. | 342/357.12 |
| 2004/0013175 | A1 | * | 1/2004 | Tanaka | 375/149 |
| 2007/0008217 | A1 | * | 1/2007 | Yang et al. | 342/357.12 |
| 2007/0032977 | A1 | * | 2/2007 | Kaval et al. | 702/124 |
| 2007/0076788 | A1 | * | 4/2007 | Jia et al. | 375/150 |

FOREIGN PATENT DOCUMENTS

| EP | 1 244 225 A2 | 9/2002 |
| TW | 525356 | 3/2003 |
| TW | I245570 | 12/2005 |

OTHER PUBLICATIONS

Mikko Kokkonen and Samuli Pietilä,, "A New Bit Synchronization Method for a GPS Receiver", 2002 IEEE, pp. 85-90, 0-7803-7251-4/02.

* cited by examiner

*Primary Examiner* — James S Wozniak
*Assistant Examiner* — Abdelali Serrou
(74) *Attorney, Agent, or Firm* — Winston Hsu; Scott Margo

(57) ABSTRACT

A method for determining a bit boundary of a repetition-coded signal including bits each having a plurality of epochs includes (a) counting the epochs repeatedly from an initial number to a predetermined number in a predetermined time, (b) sensing sign changes in the epochs, (c) recording each sensed sign change with a weighting function to a corresponding counting number of the epoch, and (d) determining the bit boundary according to a result of step (c).

13 Claims, 8 Drawing Sheets

METHOD AND APPARATUS FOR DETERMINING A BIT BOUNDARY OF A REPETITION-CODED SIGNAL

BACKGROUND

The present invention provides a method for determining a bit boundary of a repetition-coded signal, and more particularly, a method for increasing efficiency of extracting information from the repetition-coded signal especially for low C/N use by recording each sensed sign change of the repetition-coded signal with a weighting function.

In positioning systems, such as a global positioning system (GPS), a positioning receiver detects positions based on radio waves and time differences between satellites and itself, or a triangular positioning theorem, so that the positioning receiver requires four satellite signals to calculate latitude and altitude. In the GPS system, each satellite transmits a spread spectrum modulated signal that is modulated with a code, C/A (coarse/acquisition) or P (precision) code, which is individual for each satellite. Thus, the positioning receiver can distinguish signals transmitted by different satellites from each other by using a reference code corresponding to the satellite code generated locally in the positioning receiver.

In poor signal conditions, a signal transmitted by a satellite is strongly attenuated when arriving at the positioning receiver because of climatic conditions or obstacles, such as buildings and surrounding grounds in the routing of the signal. Also, the signal can travel to the positioning receiver through a plurality of different routes, which causes so-called multipath propagation and aggravates the synchronizing of the positioning receiver with a wished signal because the transmitted signal arrives at the receiver through different routings. Due to this multipath propagation, the same signal is received as several signals with different phases.

In the poor signal conditions, position and time uncertainties are large, and the C/A-code epoch ambiguity results in the lack of knowledge of data bit timing. Thus, bit synchronization is required, and there are a number of techniques available to achieve bit synchronization by detecting the moment of change for the bit (boundary). The detection of bit boundary is necessary in order to detect navigation data, to use coherent integration in the tracking loop, and to calculate pseudo ranges.

For example, a histogram approach of the prior art breaks an assumed data bit period (20 ms) into 20 C/A-code 1-ms epoch periods and senses sign changes between successive epochs. For each sensed sign change, a corresponding histogram cell count is incremented until a count in one specific cell exceeds the other 19 bins by a predetermined amount. The procedure of the histogram approach is as follows. A cell counter is arbitrarily set and runs from 1 to 20. Each sensed sign change is recorded by adding 1 to a histogram cell corresponding to the cell counter. The procedure continues until one of the following occurs: (a) two cell counts exceed a first threshold, (b) loss of lock, and (c) one cell count exceeds a second threshold. If (a) occurs, bit synchronization fails because of low C/N or lack of bit sign transitions, and bit synchronization is reinitialized. If (b) occurs, lock is reestablished. If (c) occurs, bit synchronization is successful, and the C/A-code epoch count is reset to the correct value.

According to the prior art histogram approach, a receiver can find out a bit boundary if one cell count exceeds the second threshold. However, when noise power is high or signal quality is poor, using the histogram approach makes it easy to misjudge the bit boundary. For example, please refer to FIG. 1 and FIG. 2. FIG. 1 illustrates a schematic diagram of correlation accumulation values versus epochs in case that signal quality is poor, while FIG. 2 illustrates a histogram corresponding to FIG. 1 according to the prior art histogram approach. Since signal quality is poor, the histogram in FIG. 2 shows a position of 1 to be the position of the bit transition, which is 10 in reality.

In short, the prior art histogram approach is not suitable for low C/N use.

SUMMARY OF THE INVENTION

An exemplary embodiment of a method for determining a bit boundary of a repetition-coded signal comprising bits each having a plurality of epochs comprises (a) counting the epochs repeatedly from an initial number to a predetermined number in a predetermined time, (b) sensing sign changes in the epochs, (c) recording each sensed sign change with a weighting function to a corresponding counting number of the epoch, and (d) determining the bit boundary according to a result of step (c).

An exemplary embodiment of an apparatus for determining a bit boundary of a repetition-coded signal comprising bits each having a plurality of epochs comprises a counter for counting the epochs repeatedly from an initial number to a predetermined number in a predetermined time, a sensing unit for sensing sign changes in the epochs, a storage unit for recording each sensed sign change with a weighting function to a corresponding counting number of the epoch, and a decision unit for determining the bit boundary according to a statistic result of the storage unit after the predetermined time.

An exemplary embodiment of a GPS receiver comprising the apparatus for determining a bit boundary of a repetition-coded signal comprising bits each having a plurality of epochs.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
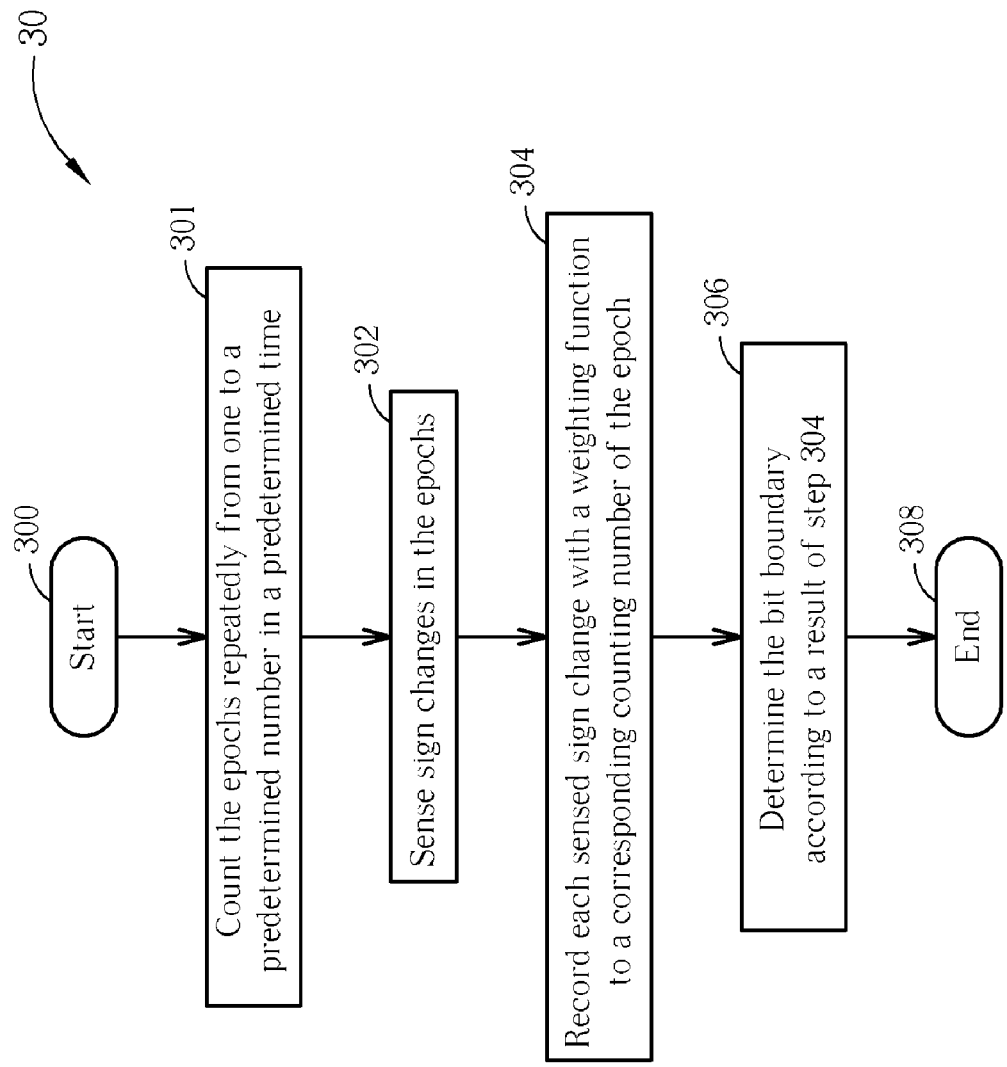
FIG. 3 illustrates a flowchart of a process in accordance with the present invention.

Please refer to FIG. 3, which illustrates a flowchart of a process 30 in accordance with the present invention. The process 30 is utilized for determining a bit boundary of a repetition-coded signal, such as positioning signals from satellites in a GPS system, composed of bits each having a plurality of epochs, and includes following steps:

Step 300: start.

Step 301: count the epochs repeatedly from an initial number to a predetermined number in a predetermined time.

Step 302: sense sign changes in the epochs.

Step 304: record each sensed sign change with a weighting function to a corresponding counting number of the epoch.

Step 306: determine the bit boundary according to a result of step 304.

Step 308: end.

According to the process 30, the present invention records each sensed sign change with the weighting function to a corresponding counting number of the epoch, so as to make a possible bit transition easier to be found. For example, the present invention can record a sensed sign change of a possible bit transition into a histogram cell with a weighting greater than a weighting corresponding to an unlikely bit transition. Therefore, the procedure of the present invention is as follows. A cell counter is arbitrarily set and runs from 1 to 20 (or from 0 to 19). Each sensed sign change is recorded by adding 1*K to a histogram cell corresponding to the cell counter, wherein K is a result of the weighting function. The procedure continues until one of the following occurs: (a) two cell counts exceed a first threshold, (b) loss of lock, and (c) one cell count exceeds a second threshold. If (a) occurs, bit synchronization fails because of low C/N or lack of bit sign transitions, and bit synchronization is reinitialized. If (b) occurs, lock is reestablished. If (c) occurs, bit synchronization is successful, and the C/A-code epoch count is reset to the correct value.

Therefore, by recording each sensed sign change with the weighting function, the present invention can find the possible bit transition. Note that, the weighting function is to make the possible bit transition more obvious, and numerous equations can achieve this goal. For example, K=Wc, and $$\frac{1}{Wc} = \left| \sum_{i=k-10}^{k+9} (i^{th} \text{ epoch correlation value}) \right| \quad \text{(Eq. 1)}$$

where k is a position of an epoch having a sign change in a bit.

Figure 1:
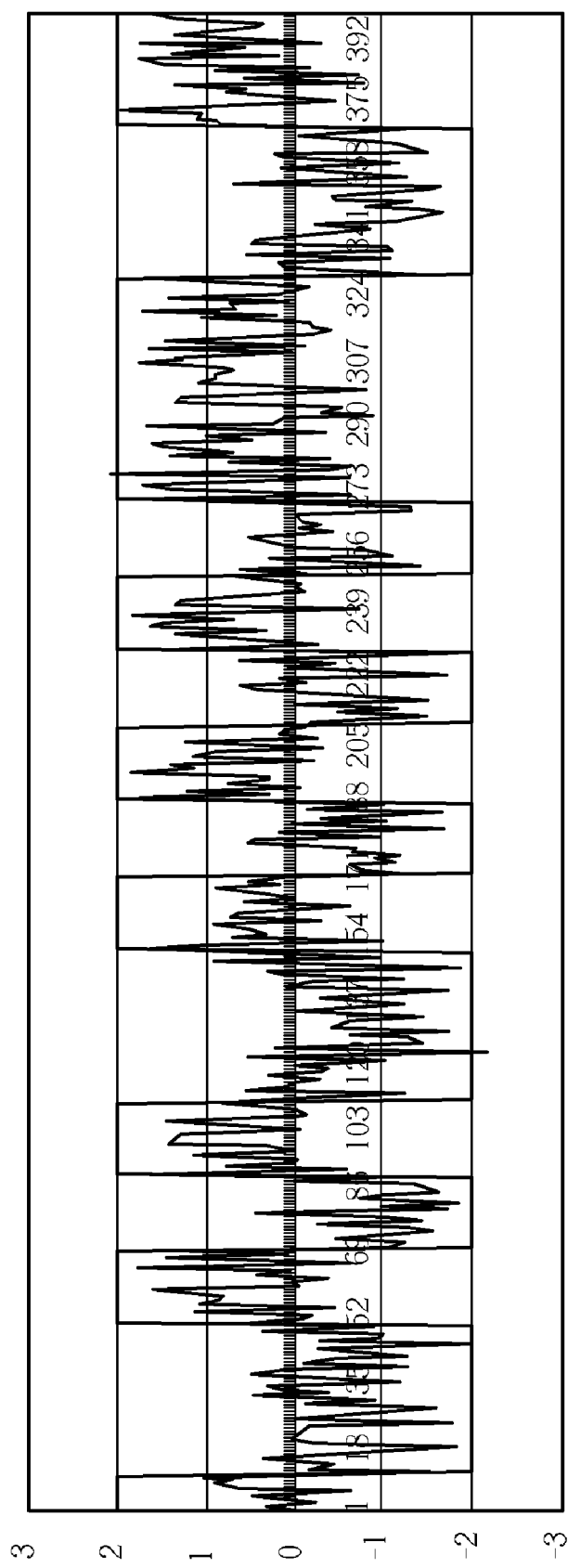
FIG. 1 illustrates a schematic diagram of correlation accumulation values versus epochs in case that signal quality is poor.
Figure 2:
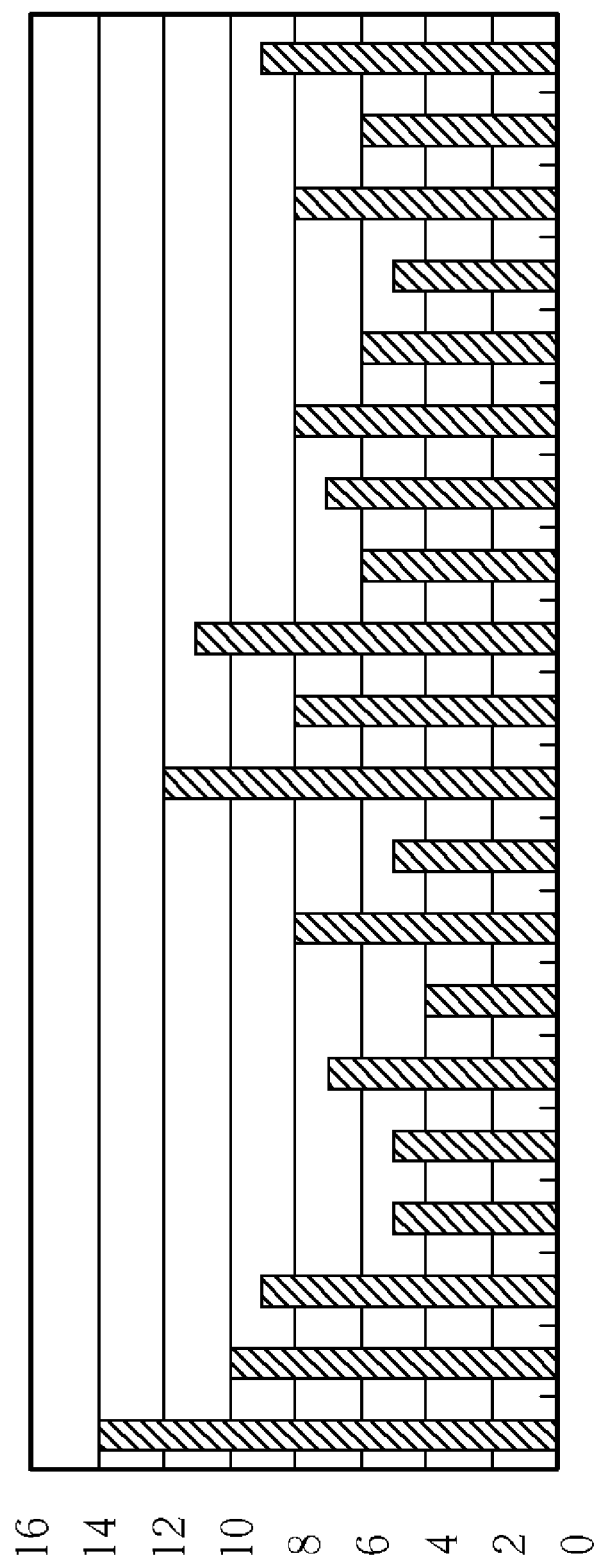
FIG. 2 illustrates a histogram corresponding to FIG. 1 according to the prior art histogram approach.
Figure 4:
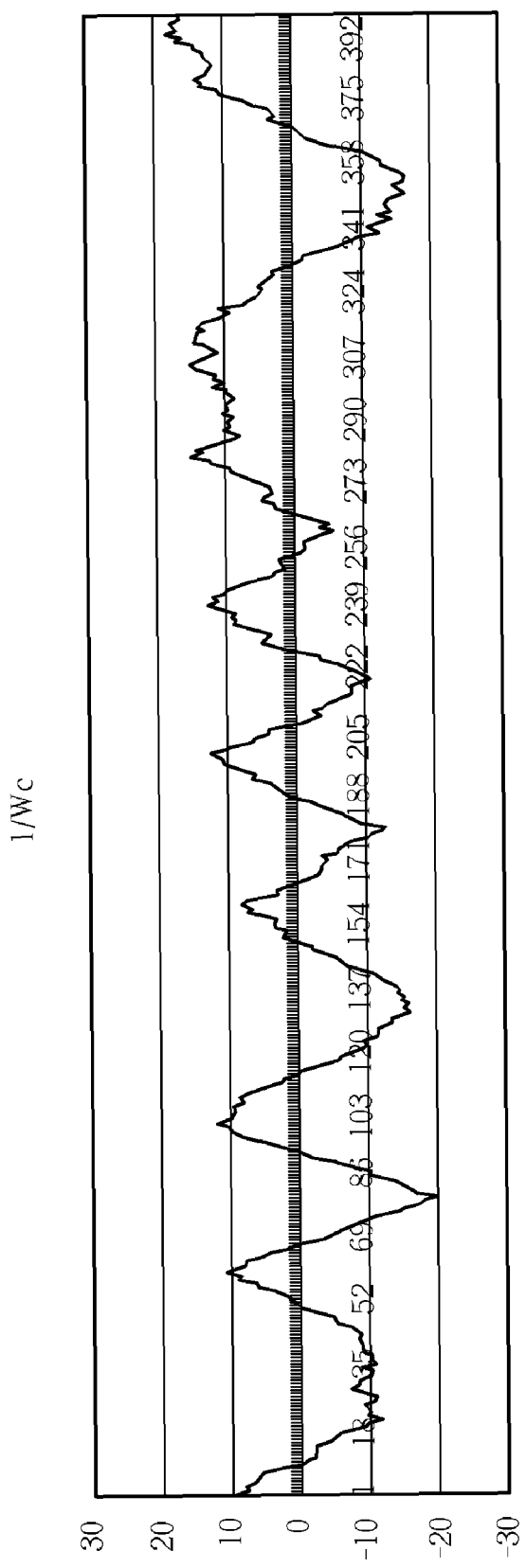
FIG. 4 illustrates a schematic diagram of a result corresponding to FIG. 1 in accordance with an embodiment of the present invention.
Figure 5:
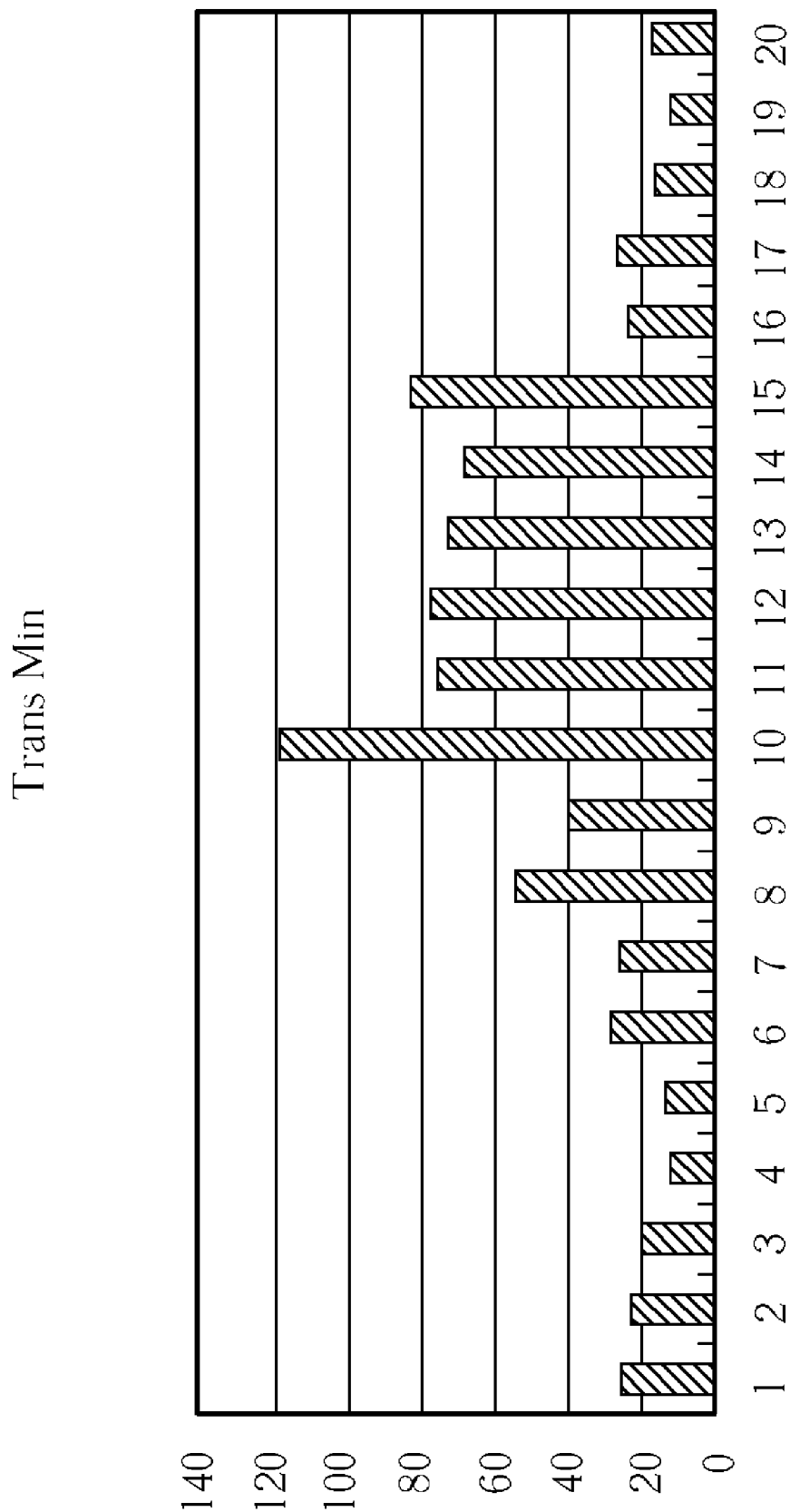
FIG. 5 illustrates a histogram corresponding to FIG. 4.

According to Eq. 1, when a bit transition occurs, an average of samples in front and following of a position of the bit transition will be close to a threshold value (ex. 0). Please refer to FIG. 4 and FIG. 5. FIG. 4 illustrates a schematic diagram of a result of Eq. 1 corresponding to FIG. 1, and FIG. 5 illustrates a histogram corresponding to FIG. 4. The histogram in FIG. 5 shows a position of 10 having the highest value, which is the position of the bit transition. Therefore, the histogram shown in FIG. 5 can be used to find out the exact position of the bit transition, so as to determine the bit boundary.

Other than Eq. 1, the weighting function can be K=Wb, and $$Wb = \left| \sum_{i=k-10}^{k-1} (i^{th} \text{ epoch correlation value}) - \sum_{j=k}^{k+9} (j^{th} \text{ epoch correlation value}) \right| \quad \text{(Eq. 2)}$$

where k is a position of an epoch having a sign change in a bit.

Figure 6:
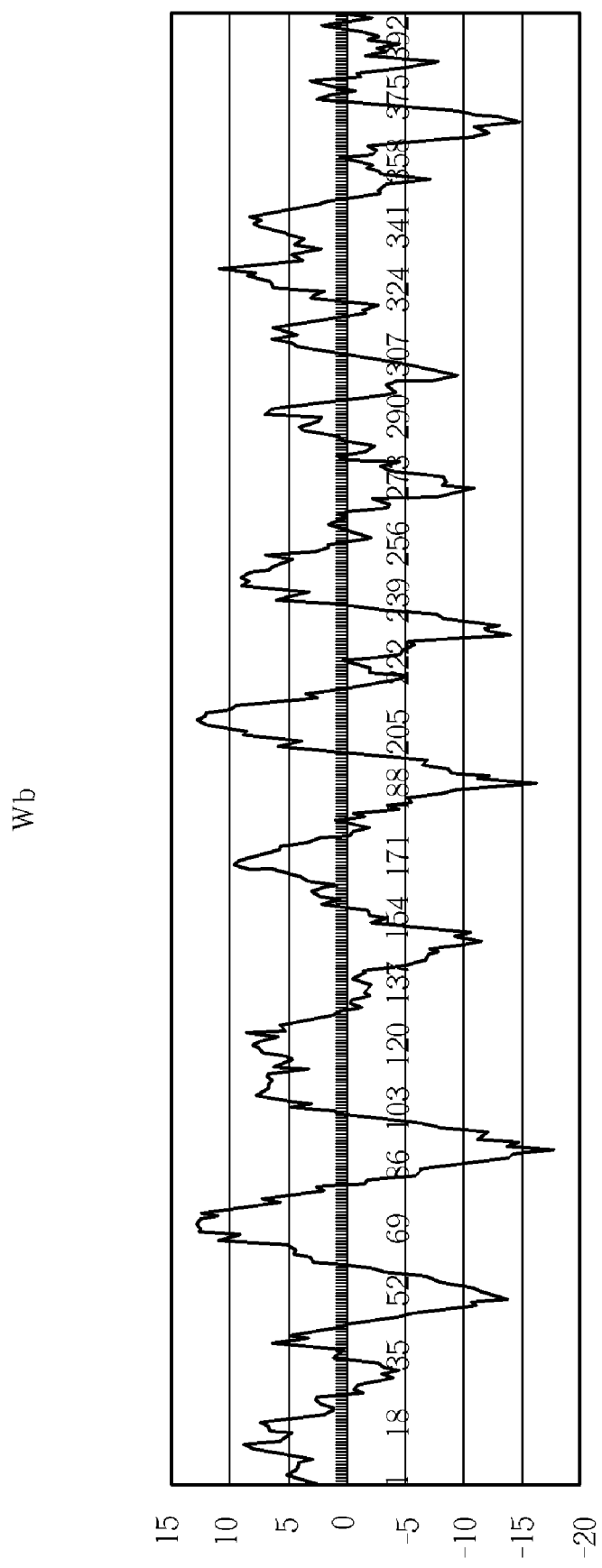
FIG. 6 illustrates a schematic diagram of a result corresponding to FIG. 1 in accordance with another embodiment of the present invention.
Figure 7:
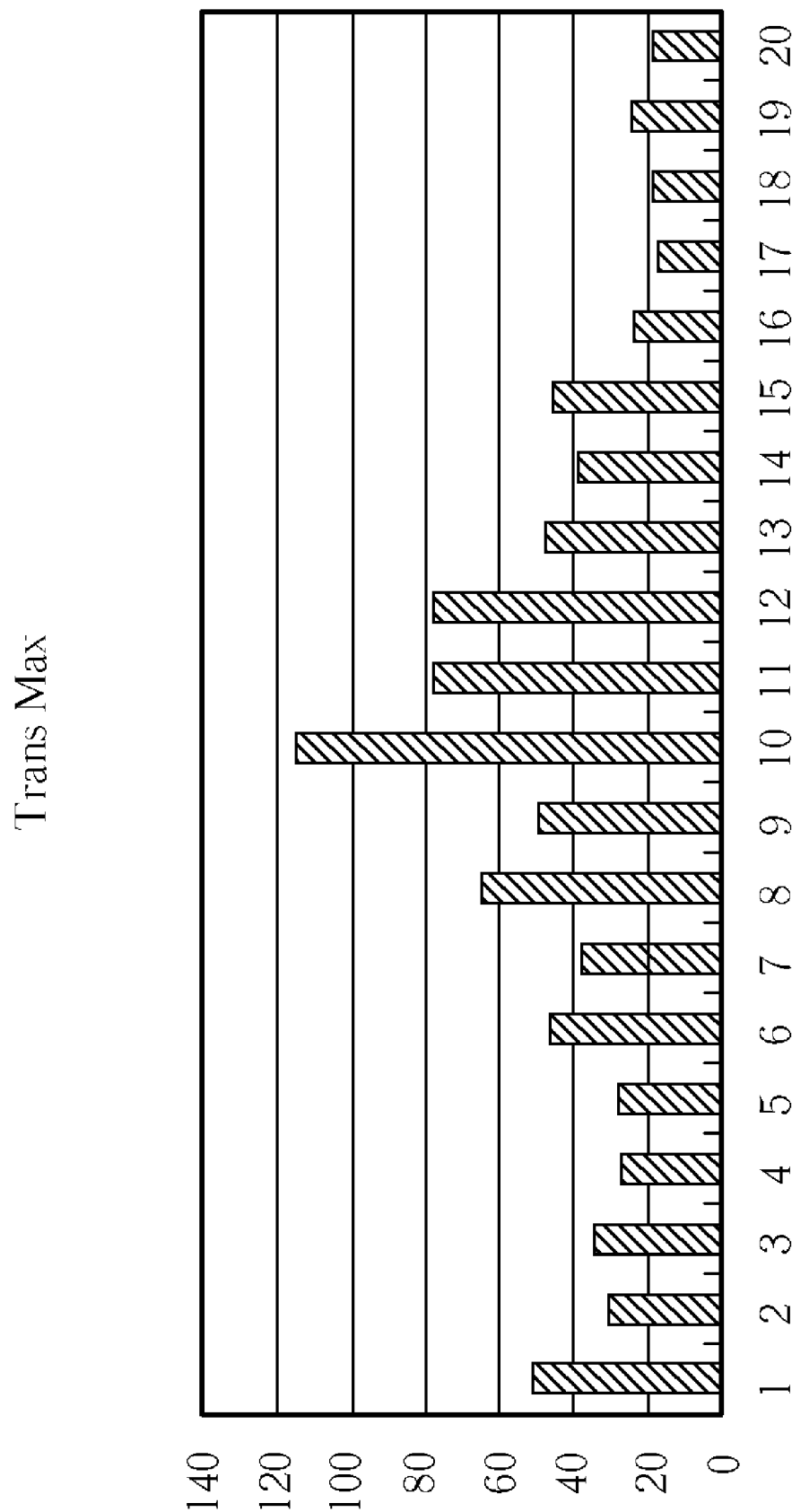
FIG. 7 illustrates a histogram corresponding to FIG. 6.

According to Eq. 2, a maximum or minimum value occurs when a bit transition occurs, and a value close to 0 when successive bits are 0s or 1s. Please refer to FIG. 6 and FIG. 7. FIG. 6 illustrates a schematic diagram of a result of Eq. 2 corresponding to FIG. 1, and FIG. 7 illustrates a histogram corresponding to FIG. 6. The histogram in FIG. 7 shows a position of 10 having the most value, which is the position of the bit transition. Therefore, the histogram shown in FIG. 7 can be used to find out the exact position of the bit transition, so as to determine the bit boundary.

As mentioned above, in poor signal conditions, position and time uncertainties are large, and the C/A-code epoch ambiguity results in the lack of knowledge of data bit timing. The present invention can efficiently find out bit boundaries by making the possible bit transitions more obvious with the weighting functions, so as to achieve bit synchronization, to detect navigation data, to use coherent integration in the tracking loop, and to calculate pseudo ranges.

Figure 8:
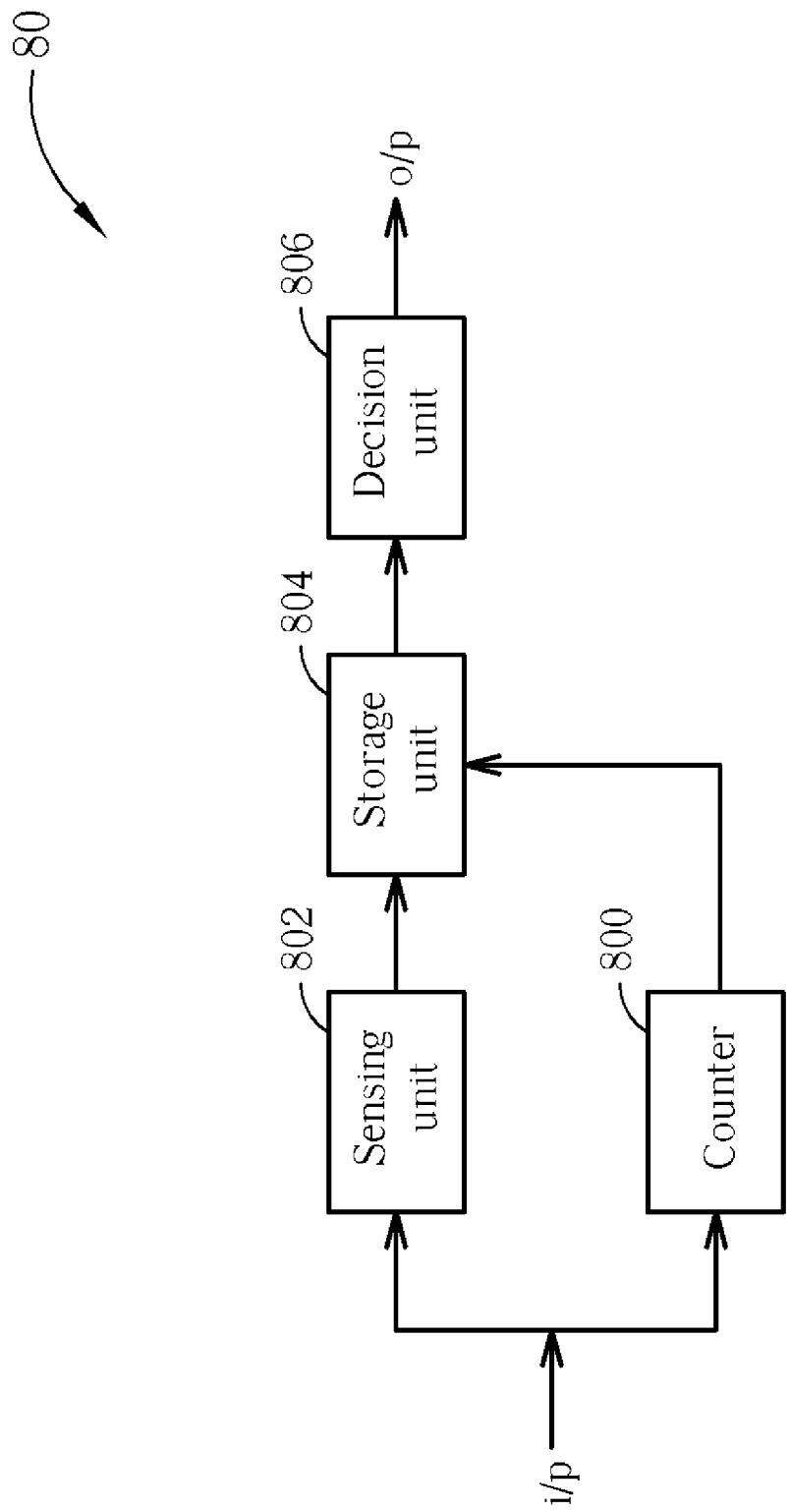
FIG. 8 illustrates a block diagram of an apparatus in accordance with the present invention.

As to an implementation of the process 30, please refer to FIG. 8, which illustrates a block diagram of an apparatus 80 in accordance with the present invention. The apparatus 80 is utilized for determining a bit boundary of a repetition-coded signal, such as positioning signals from satellites in a GPS system, composed of bits each having a plurality of epochs, and includes a counter 800, a sensing unit 802, a storage unit 804, and a decision unit 806. The counter 800 counts the epochs repeatedly from an initial number to a predetermined number in a predetermined time. The sensing unit 802 senses sign changes in the epochs. The storage unit 804 records each sensed sign change with a weighting function to a corresponding counting number of the epoch. The decision unit 806 determines the bit boundary according to a statistic result of the storage unit after the predetermined time.

Therefore, the apparatus 80 can make a possible bit transition easier to be found. For example, the counter 800 is arbitrarily set and runs from 1 to 20 (or from 0 to 19). Each sign change sensed by the sensing unit 802 is recorded by adding 1*K to a histogram cell corresponding to the cell counter in the storage unit 804, wherein K is a result of the weighting function. Then, the decision unit 806 determines bit synchronization according to the following rules: (a) two cell counts exceed a first threshold, (b) loss of lock, and (c) one cell count exceeds a second threshold. If (a) occurs, bit synchronization fails because of low C/N or lack of bit sign transitions, and bit synchronization is reinitialized. If (b) occurs, lock is reestablished. If (c) occurs, bit synchronization is successful, and the C/A-code epoch count is reset to the correct value.

Therefore, by recording each sensed sign change with the weighting function, the apparatus 80 can find the possible bit transition. Note that, the weighting function is to make the possible bit transition more obvious, and numerous equations can achieve this goal, such as Eq. 1 and Eq. 2 mentioned above.

In comparison, the present invention enhances the histogram approach to make the possible bit transitions more obvious than the prior art does, such that a positioning receiver designed according the present invention is useful even in poor signal conditions, in which position and time uncertainties are large. That is, the present invention can improve efficiency of extracting information from repetition-coded signals, and is suitable for low C/N use.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for determining a bit boundary of a repetition-coded signal, the method comprising following steps:
   (a) receiving a repetition-coded signal with a receiver, the repetition-coded signal comprising bits each having a plurality of epochs;
   (b) using a counter of the receiver to count the epochs repeatedly from an initial number to a predetermined number in a predetermined time;
   (c) sensing sign changes in the epochs;
   (d) recording each sensed sign change with a weighting function to a corresponding counting number of the epoch; and
   (e) determining the bit boundary according to a result of step (d).

2. The method of claim 1, wherein step (d) comprises recording each sensed sign change by adding 1*K to a histogram corresponding to the counting number of the epoch.

3. The method of claim 2, wherein K=Wc, and $$\frac{1}{Wc} = \left| \sum_{i=k-a}^{k+b} (i^{th} \text{ epoch correlation value}) \right|$$

where k is a position of an epoch having a sign change, a>0, b>0, and (a+b+1) is equal to the predetermined number.

4. The method of claim 3, wherein the Wc is limited in a threshold.

5. The method of claim 2, wherein K=Wb, and $$Wb = \left| \sum_{i=k-c}^{k-1} (i^{th} \text{ epoch correlation value}) - \sum_{j=k}^{k+d} (j^{th} \text{ epoch correlation value}) \right|$$

where c>1, d>0, k is a position of an epoch having a sign change, and (c+d+1) is equal to the predetermined number.

6. The method of claim 1, wherein the repetition-coded signal is a positioning signal outputted from a satellite.

7. An apparatus for determining a bit boundary of a repetition-coded signal comprising bits each having a plurality of epochs, the apparatus comprising:
   a counter for counting the epochs repeatedly from an initial number to a predetermined number in a predetermined time;
   a sensing unit for sensing sign changes in the epochs;
   a storage unit for recording each sensed sign change with a weighting function to a corresponding counting number of the epoch; and
   a decision unit for determining the bit boundary according to a statistic result of the storage unit after the predetermined time.

8. The apparatus of claim 7, wherein storage unit records each sensed sign change by adding 1*K to a histogram corresponding to the counting number of the epoch.

9. The apparatus of claim 8, wherein K=Wc, and $$\frac{1}{Wc} = \left| \sum_{i=k-a}^{k+b} (i^{th} \text{ epoch correlation value}) \right|$$

where k is a position of an epoch having a sign change in a bit, a>0, b>0, and (a+b+1) is equal to the predetermined number.

10. The apparatus of claim 9, wherein the Wc is limited in a threshold.

11. The apparatus of claim 8, wherein K=Wb, and $$Wb = \left| \sum_{i=k-c}^{k-1} (i^{th} \text{ epoch correlation value}) - \sum_{j=k}^{k+d} (j^{th} \text{ epoch correlation value}) \right|$$

where k is a position of an epoch having a sign change, c>1, d>0, and (c+d+1) is equal to the predetermined number.

12. The apparatus of claim 7, wherein the repetition-coded signal is a positioning signal outputted from a satellite.

13. A GPS receiver comprising the apparatus for determining a bit boundary of a repetition-coded signal comprising bits each having a plurality of epochs of claim 7.

* * * * *